United States Patent

[11] 3,576,495

[72] Inventor Akiyuki Yoshizato
Tokyo, Japan
[21] Appl. No. 790,324
[22] Filed Jan. 10, 1969
[45] Patented Apr. 27, 1971
[73] Assignee Alps Electric Company, Limited
Tokyo, Japan
[32] Priority Mar. 27, 1968
[33] Japan
[31] 43/19397

[54] TUNING CIRCUIT HAVING MEANS FOR COMPENSATING FOR THE COUPLING OF THE LOCAL OSCILLATOR SIGNAL TO THE ANTENNA WINDING

7 Claims, 9 Drawing Figs.

[52] U.S. Cl. .......... 325/436, 325/475
[51] Int. Cl. .......... H04b 1/26
[50] Field of Search .......... 325/430, 436, 437, 438, 439, 473, 475, 476, 479

[56] References Cited

UNITED STATES PATENTS

| | | | |
|---|---|---|---|
| 2,823,305 | 2/1950 | Aschermann .......... | 325/436 |
| 3,042,869 | 7/1962 | Gosslau .......... | 325/436 |
| 3,130,370 | 4/1964 | Kondo et al. .......... | 325/436 |

*Primary Examiner*—Robert L. Griffin
*Assistant Examiner*—R. S. Bell
*Attorney*—James and Franklin

ABSTRACT: A tuning circuit comprises an antenna winding inductively coupled to a first inductor, which in turn is inductively coupled to a second inductor. A local oscillator circuit induces a signal in said second inductor, which signal tends to cause an unwanted signal to be induced in the first inductor and ultimately in the antenna winding. Means are provided to operatively couple the second inductor and the antenna winding to induce in the latter a second signal in opposite phase to the unwanted signal, thereby to substantially cancel the unwanted signal in the antenna winding.

INVENTOR
AKIYUKI YOSHIZATO
BY James and Franklin
ATTORNEY

INVENTOR
AKIYUKI YOSHIZATO
BY James and Franklin
ATTORNEY

TUNING CIRCUIT HAVING MEANS FOR COMPENSATING FOR THE COUPLING OF THE LOCAL OSCILLATOR SIGNAL TO THE ANTENNA WINDING

The present invention relates to tuning circuit, and particularly to an RF tuning circuit having an input antenna stage, a double tuned stage and a local oscillator stage.

Conventional RF tuners comprise an antenna circuit having an antenna winding inductively coupled to the primary side of a double tuned circuit. The secondary side of the tuned circuit is inductively coupled to the primary side and to a local oscillator stage, and means are provided to mix the received RF signal with the local oscillator signal to derive an IF signal, which is amplified and detected in subsequent stages of the communications receiver.

Problems arise in the operation of these tuning circuits as a result of the unavoidable coupling of the local oscillator signal to the primary side of the double tuned stage and then to the antenna winding. As a result, an unwanted signal of significant amplitude at the local oscillator signal frequency is generated in the antenna winding, the antenna winding thus representing an effective transmitting antenna for signals at that local oscillator frequency. The detection of these radiated signals at receivers in the surrounding area will produce interference RF signals at those receivers. Government standards therefore limit the permissible amount of such radiation from receivers of this type. For this reason, the magnitude of the local oscillator signal induced in the antenna winding must be made sufficiently small to conform the operating characteristics of the receiver to the maximum allowable radiation standards established by the government.

One approach to this problem is the provision of a shielding plate in the receiver housing between the antenna input stage and the local oscillator stage. While this plate does reduce the level of the radiated local oscillator signal to some extent, a significant amount of the local oscillator signal is still coupled to the antenna winding through the opening necessarily provided in the plate to allow the received RF signal to enter the receiver proper.

It is, therefore, an object of the present invention to provide a tuning circuit in which the coupling of the local oscillator signal to the antenna winding, and the consequent radiation from the antenna winding of signals at the receiver local oscillator frequency, is eliminated or substantially reduced by means of a relatively inexpensive and simple modification to the known tuner circuit.

It is a more specific object of the present invention to provide a tuning circuit in which a signal derived from the secondary stage of a double-tuned circuit is induced in the antenna winding to cancel or substantially reduce the magnitude of an unwanted signal in the antenna winding derived from the local oscillator signal.

The antenna winding is normally inductively coupled to the primary side of the tuning stage, which is in turn inductively coupled to the secondary side thereof. These inductive couplings produce an unwanted signal in the antenna winding at the same frequency as the oscillator frequency signal fed into the secondary, and, because of the intervening double inductive coupling, in the same phase as the oscillator frequency signal. In accordance with the present invention the antenna winding is additionally directly coupled to the secondary side of the tuning stage. This additional coupling produces in the antenna winding a second signal at the oscillator signal frequency, that second signal being substantially in phase opposition to the oscillator frequency signal, and hence also substantially in phase opposition to the unwanted signal. As a result that unwanted signal is cancelled or substantially reduced.

To the accomplishment of the above, and to such other objects as may hereinafter appear, the present invention relates to an RF tuning circuit as defined in the appended claims and as described in this specification, taken together with the accompanying drawings in which:

Figure 9:
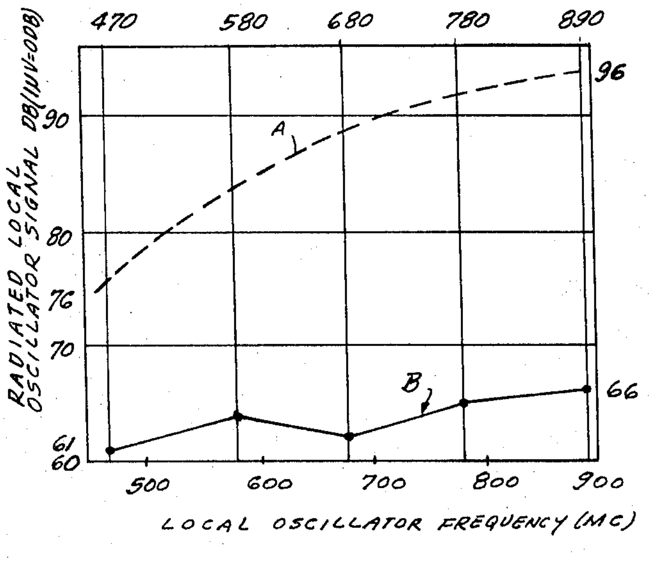

FIGS. 5—8 are schematic diagrams of tuning circuits illustrating alternative embodiments of the present invention; and FIG. 9 is a graphical representation of the attenuation of the local oscillator frequency at the antenna winding as a function of the local oscillator frequency, illustrating the improved operation of the tuning circuits of the present invention as compared to the prior art tuning circuit.

Figure 1:
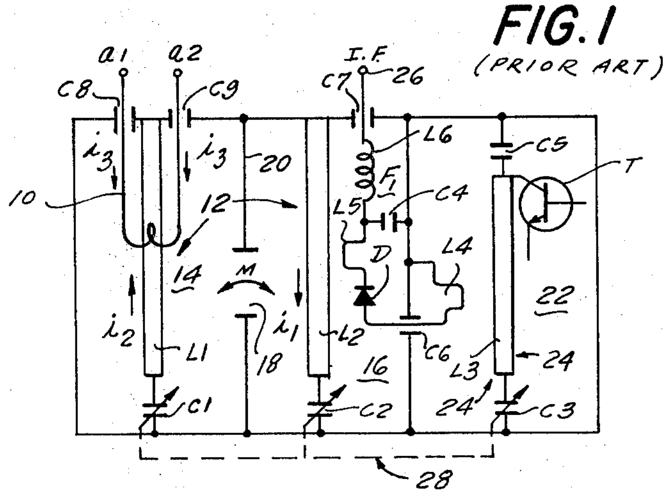
FIG. 1 (PRIOR ART)
FIG. 1 is a schematic diagram of a typical prior art tuning circuit.

To obtain a better understanding of the features of the RF tuning circuit of this invention and particularly the reduction of local oscillator radiation at the antenna winding obtained thereby, a typical prior art circuit and the radiation problems attendant therein are disclosed with reference to the tuning circuit of FIG. 1.

Figure 2:
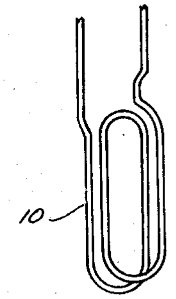
FIG. 2 (PRIOR ART)
FIG. 2 is an elevation view illustrating the conventional antenna winding of the circuit of FIG. 1.

That circuit comprises an antenna coupling circuit in the form of an antenna transformer or antenna winding 10 connected to antenna input terminals *a*1 and *a*2, winding 10 being shown in detail in FIG. 2. A double tuned tuning section 12 has a primary tuning stage 14 comprising an inductor $L_1$ in series connection with a variable capacitor $C_1$, and a secondary tuning stage 16 comprising inductor $L_2$ and a variable capacitor $c_2$. Antenna winding 10 is inductively coupled to primary tuning circuit 14, and tuning circuits 14 and 16 are mutually inductively coupled to one another through a window 18 formed in a grounded plate 20, the mutual inductance factor being designated M.

A local oscillator stage 22, comprising a transistor T having a tuning stage 24 comprising an inductor $L_3$ and a variable capacitor $C_3$ connected in its collector circuit, produces the local oscillator signal at a frequency determined by the tuning of stage 24, that signal being inductively coupled to an inductive winding $L_4$ and then to one terminal of a mixing diode D. The received RF signal is inductively coupled from the secondary tuning stage 16 to an inductive winding $L_5$ and to the other terminal of diode D. Diode D mixes these two signals to derive an IF signal in a known manner which is applied to an IF node 26 through a filter F comprising an inductor $L_6$ and a grounded capacitor $C_4$.

Variable capacitors $C_1$, $C_2$ and $C_3$ are mechanically ganged together as indicated at 28 to simultaneously tune stages 14, 16 and 24 upon a single tuning operation in a known manner. One end of inductor $L_3$ is connected to ground through capacitor $C_5$ and the connection between winding $L_4$ and diode D is effected through a feedthrough capacitor $C_6$. The IF signal is applied to IF node 26 from filter F through a feedthrough capacitor $C_7$. Similar feedthrough capacitors $C_8$ and $C_9$ are provided through which the ends of antenna winding 10 are connected to the antenna input terminals *a*1 and *a*2.

In operation of the circuit of FIG. 1, a potential signal *e* at the local oscillator frequency is induced in the inductor $L_2$ as a result of the inductive coupling of the local oscillator signal thereto, and a current $i_1$ is caused to flow in secondary tuning stage 16 as a result of that potential. That current is turn induces a potential in inductor $L_1$ as a result of the mutual inductance between inductors $L_1$ and $L_2$ and causes a current $i_2$ to flow in inductor $L_1$.

From Kierchoff's voltage law the following equations are obtained:

$$(1)\qquad i_1\left(jwL_2-\frac{1}{jwC_2}+R_2\right)+jwMi_2=e$$

$$(2)\qquad i_2\left(jwL_1-\frac{1}{jwC_1}+R_1\right)-jwMi_1=0$$

where *w* is the angular frequency of the local oscillator signal, and $R_1$ and $R_2$ are the respective resistance values of the primary and tuning stages 14 and 16, representing the high frequency energy loss in these stages.

From equation (2) the following is obtained:

$$(3)\qquad \frac{i_2}{i_1}=\frac{jwM}{jwL_1-j\frac{1}{wC_1}+R1}$$

As is conventional, the resonant frequency of the primary tuning stage 14 determined by inductor $L_1$ and capacitor $C_1$ is different than the local oscillator frequency. Accordingly, the impedance of this stage at the local oscillator frequency ($w$ in the equations) is substantial, and the denominator of the right side of equation 3 is substantially larger than the numerator of the equation (i.e. the reactance value of $jwM$).

Thus, the absolute value of $i_1$ is substantially greater than the absolute value of $i_2$ and these currents are in phase opposition to one another. The current $i_2$, induced in inductor $L_1$ as a result of the local oscillator signal, induces a voltage at the local oscillator frequency in the antenna winding 10 which thus represents a transmitting antenna for unwanted RF signals (the signal current is represented by $i_3$) at the local oscillator frequency and substantially in phase therewith.

Figure 3:
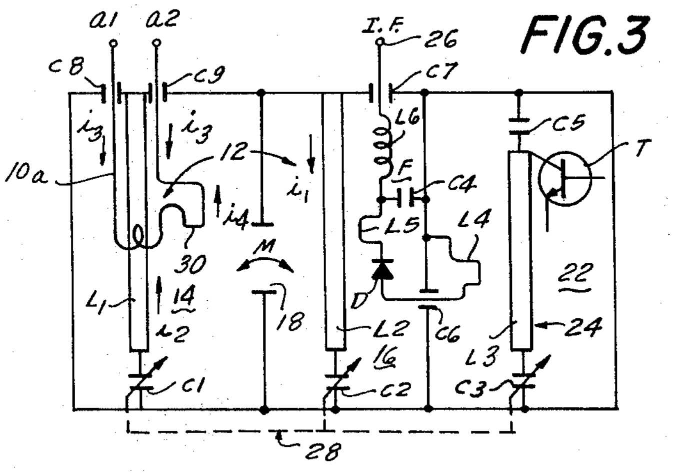
FIG. 3 is a schematic diagram of a tuning circuit illustrating one embodiment of the present invention.

The circuit of the present invention, as illustrated in one embodiment FIG. 3, provides means for cancelling or at least substantially reducing the voltage induced in the antenna winding 10 at the local oscillator frequency, and hence the unwanted current signal $i_3$, by making use of the relative amplitude and phase relations of the currents $i_1$ and $i_2$ respectively induced in the secondary and primary stages 16 and 14 of the tuning section 12 by the local oscillator signal generated at stage 22.

To this end, additional coupling means are provided to loosely couple the secondary tuning stage inductor $L_2$ and the antenna winding 10 to induce in the latter (as a result of the larger current $i_1$ in inductor $L_2$ compared to the magnitude of current $i_2$ in inductor $L_1$) an addition compensating signal (the signal current is designated $i_4$) in phase opposition and of substantially equal magnitude to the unwanted signal $i_3$ to effectively cancel or reduce by a substantial amount the resultant amplitude of the unwanted signal $i_3$ in winding 10.

Figure 4:
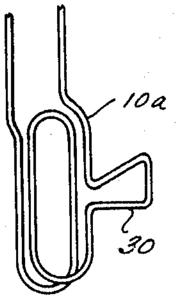
FIG. 4 is an elevation view illustrating the antenna winding of the present invention utilized in the circuit of FIG. 3.

Thus, in the circuit of FIG. 3, the antenna winding **10*a* is modified to the form shown in FIG. 4, by providing a winding section 30 in series connection with the antenna winding proper. Section 30** is arranged in loose inductive coupling relationship with the secondary stage inductor $L_2$ and has a voltage induced therein by the current $i_1$ in inductor $L_2$ which, as indicated above, is effective to produce a signal current $i_4$ which is in phase opposition to, and hence substantially cancels, the unwanted signal $i_3$.

Figures 5, 6, 7, 8:
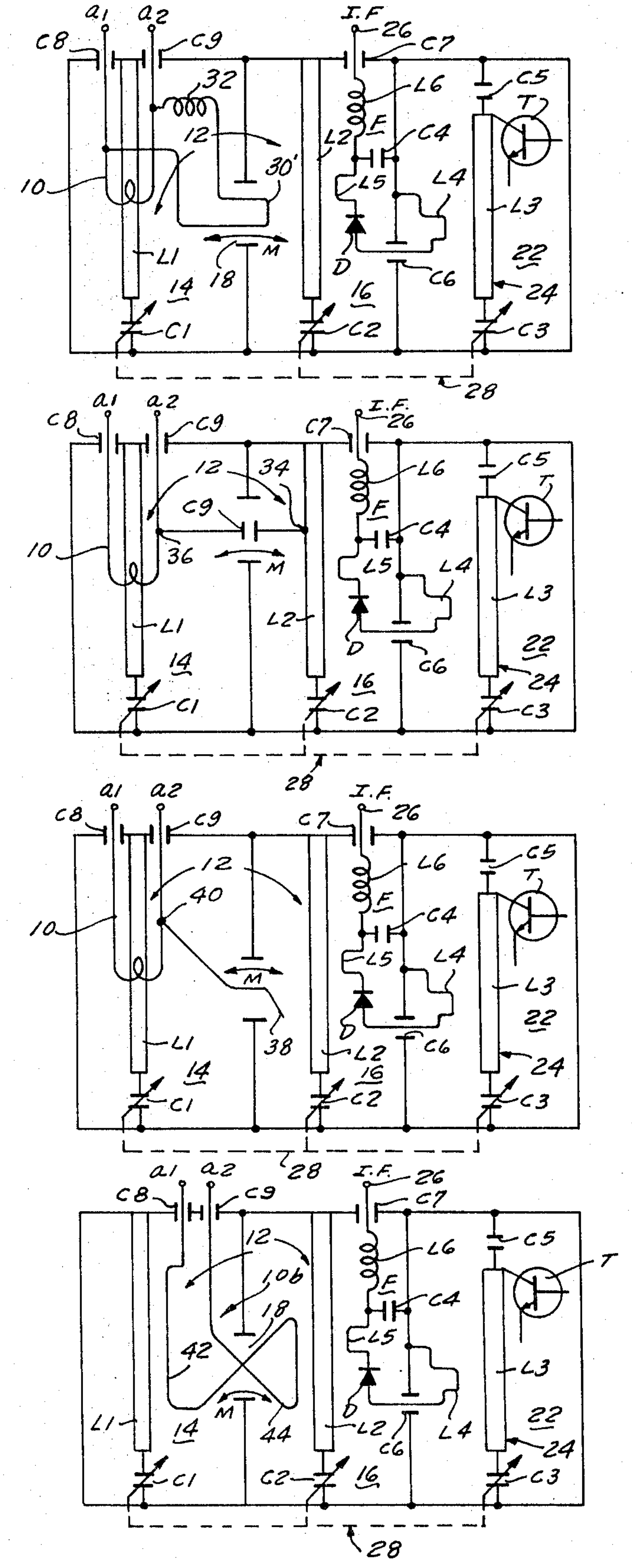

In the circuit of FIG. 5, this additional coupling means comprises an impedance matching coil 32 in series with a winding section 30′ connected in parallel to the antenna winding 10. Winding 30′ passes partly through window 18 but is relatively loosely inductively coupled to inductor $L_2$ as compared to the close coupling of the antenna winding 10 and inductor $L_1$.

In the circuit of FIG. 6, the additional compensating coupling between the inductor $L_2$ and the antenna winding 10 is effected by a capacitor $C_9$, having a relatively low value of capacitance, which passes through window 18 and is connected to inductor $L_2$ at point 34, and to antenna winding 10 at point 36.

In the circuit of FIG. 7, the additional coupling means comprises a conducting line 38 connected at one end to antenna winding 10 at point 40, its other end passing through window 18 in proximity to inductor $L_2$ to effect the necessary loose inductive coupling between line 38 and inductor $L_2$.

In the circuit of FIG. 8, the antenna winding **10*b* is formed as a figure-eight loop, having a first winding section 42 in close inductive coupling relationship with the primary inductor $L_1$, and a second winding section 44 passing through window 18 and arranged in loose inductive coupling arrangement with the secondary stage inductor $L_2$. Winding section 44 provides the means for loosely inductively coupling the local oscillator induced signal in inductor $L_2$ to the winding section 42 of antenna winding 10*b***, thereby to substantially cancel the local oscillator signal induced in the latter from the induced current in inductor $L_1$.

The improved results obtained by the circuits of the present invention, i.e. the decrease in the radiation of the local oscillator signal from the antenna winding as compared to the radiation of that signal obtained in a prior art circuit, are shown in FIG. 9, in which curve A is a plot of the level of the radiated local oscillator signal measured at a specified distance from antenna winding 10, as expressed in db. (luv = 0 db.) as a function of frequency (in mc.) for the prior art circuit, and curve B is a similar plot for the circuit of the present invention in any of its embodiments described herein.

Thus at 470 mc., the level of the local oscillator signal radiated from the prior art circuit is approximately 76 db. above the reference level, and for the circuit of this invention is only 61 db. above that level, a net reduction of approximately 15 db. Similarly at 890 mc. the local oscillator signal radiation is reduced from approximately 96 db. to 66 db. by the circuit of the present invention, a reduction of approximately 30 db.

The provision of the additional loose coupling means of the invention between the secondary stage winding inductor $L_2$ and the antenna winding 10 has only a minimal and insignificant effect on the coupling of the received RF signal from the primary stage inductor $L_1$ to the secondary stage inductor $L_2$. While the former coupling is in phase opposition to the latter, its effect upon the coupling of the RF signal to inductor $L_2$ is minimal, since the additional coupling means (e.g. winding section 30, 30′, etc.) is only loosely coupled to the secondary stage inductor $L_2$, while the primary stage inductor $L_1$ is closely coupled thereto. As a consequence of this, the overall gain of the tuning circuit for the received RF signals, as well as the receiver noise factor, is substantially the same as in the prior art circuit of FIG. 1.

Best operating results of the circuit of this invention are obtained by varying the extent of the loose coupling between the additional coupling means and the secondary stage inductor $L_2$ to achieve the maximum reduction of the local oscillator signal radiation consistent with a minimum effect upon the receiver operation on the received RF signals. This may be performed empirically and would vary for the different embodiments of that coupling means described herein, as by varying the relative spacing of winding sections 30, 30′38, or 44 with respect to inductor $L_2$ or the capacitance value of capacitor $C_9$. Moreover, further embodiments of coupling means of this type may also be used for purposes of reducing the radiation of the local oscillator signal.

The improving tuning circuit described herein may be used to advantage in RF receivers operating in the UHF, VHF or FM range for purposes of reducing the radiation of the local oscillator signal from the receiving antenna. That radiation reduction is effected by means of a simple and inexpensive modification to the antenna winding of the prior art circuit, having only a minimal effect upon the reception of RF signals.

While several embodiments of the present invention have been herein specifically disclosed, it will be apparent that many variations may be made thereto without departure from the scope of the invention as described in the following claims.

I claim:

1. A tuner for use in a communications receiver comprising an antenna winding, first signal-carrying means in inductive coupling relation with said antenna winding, second signal-carrying means inductively coupled to said first means, means for producing a first signal in said second means, there being a tendency to generate an unwanted signal in said antenna winding corresponding to said first signal, and additional means operatively inductively coupling said second means and said antenna winding and effective to induce in said antenna winding a second signal in opposing phase relation to said unwanted signal and effective to reduce or substantially cancel said unwanted signal in said antenna winding.

2. The tuner of claim 1, in which said coupling means comprises a winding section in operative series connection with said antenna winding and arranged in loose inductive relationship with said second means.

3. The tuner of claim 1, in which said coupling means comprises a winding section in operative parallel circuit relationship with said antenna winding and arranged in loose inductance coupling relationship with said second means.

4. The tuner of claim 3, comprising impedance matching means in series connection with said winding section.

5. The tuner of claim 1, in which said coupling means comprises a conducting line connected at one end to said antenna winding and having its other end loosely inductively coupled to said second means.

6. The tuner of claim 1, in which said coupling means comprises capacitance means operatively connected between said antenna winding and said second means.

7. The tuner of claim 1, in which said antenna winding comprises first and second winding section, said first winding section being closely inductively coupled to said first means said second winding section being loosely inductively coupled to said inductance means and defining said coupling means.